United States Patent
Hamilton et al.

(10) Patent No.: US 11,831,136 B2
(45) Date of Patent: Nov. 28, 2023

(54) POKE-THROUGH FLOOR FITTING

(71) Applicant: AFC Cable Systems, Inc., New Bedford, MA (US)

(72) Inventors: Wayne Hamilton, Mesa, AZ (US); Eugene Ellis, Taunton, MA (US); Paulo da Moura, Dorchester, MA (US); Stephen Lundgren, Marion, MA (US); Jessica Poratti, Mansfield, IL (US)

(73) Assignee: AFC CABLE SYSTEMS, INC., New Bedford, MA (US)

( * ) Notice: Subject to any disclaimer, the term of this patent is extended or adjusted under 35 U.S.C. 154(b) by 120 days.

(21) Appl. No.: 17/560,417

(22) Filed: Dec. 23, 2021

(65) Prior Publication Data
US 2023/0208121 A1    Jun. 29, 2023

(51) Int. Cl.
*H02G 3/08* (2006.01)
*H02G 3/18* (2006.01)
*H02G 3/12* (2006.01)

(52) U.S. Cl.
CPC ............... *H02G 3/081* (2013.01); *H02G 3/12* (2013.01); *H02G 3/185* (2013.01)

(58) Field of Classification Search
CPC .......... H02G 3/08; H02G 3/081; H02G 3/088; H02G 3/10; H02G 3/12; H02G 3/121; H02G 3/123; H02G 3/14; H02G 3/185; H02G 3/285; H02G 3/283; H05K 5/00; H05K 5/02; H05K 5/0214; H05K 5/0217; H05K 5/0247

USPC ....... 174/480, 481, 50, 53, 57, 58, 483, 482, 174/490, 502, 520; 220/3.2–3.9, 4.02; 52/220.1, 220.8
See application file for complete search history.

(56) References Cited

U.S. PATENT DOCUMENTS

| | | |
|---|---|---|
| 5,121,594 A | 6/1992 | Wuertz |
| 5,272,278 A | 12/1993 | Wuertz |
| 5,455,388 A | 10/1995 | Pratt |
| 6,018,126 A | 1/2000 | Castellani et al. |
| 6,114,623 A | 9/2000 | Bonilla et al. |
| 6,175,078 B1 | 1/2001 | Bambardekar et al. |
| 6,417,446 B1 | 7/2002 | Whitehead |
| 6,417,450 B1 | 7/2002 | Young |
| 6,545,215 B2 | 4/2003 | Young et al. |
| 6,551,130 B2 | 4/2003 | Bonilla |
| 6,552,262 B2 | 4/2003 | English et al. |
| 6,612,081 B2 | 9/2003 | Cole et al. |
| 6,696,640 B1 | 2/2004 | Castellani et al. |
| 6,720,495 B2 | 4/2004 | Castellani et al. |
| 6,750,395 B2 | 6/2004 | Stout et al. |
| 6,854,226 B2 | 2/2005 | Cole et al. |
| 7,053,296 B2 | 5/2006 | Drane et al. |
| 7,064,268 B2 | 6/2006 | Dinh |

(Continued)

*Primary Examiner* — Angel R Estrada
(74) *Attorney, Agent, or Firm* — KDW Firm PLLC

(57) ABSTRACT

Disclosed is a poke-through floor box assembly with increased accessibility and fluid drainage. An assembly may include a main housing including a central cavity, wherein the central cavity is operable to house an electrical wiring device, and a cover assembly coupled to the main housing. The cover assembly may include a frame having a sidewall and a fluid channel extending through the sidewall, and a set of main doors rotatably coupled to the frame, wherein a first main door of the set of main doors includes a cable access door.

20 Claims, 10 Drawing Sheets

(56) References Cited

U.S. PATENT DOCUMENTS

| | | |
|---|---|---|
| 7,082,729 B2 | 8/2006 | Cole et al. |
| 7,105,745 B2 * | 9/2006 | Drane .................... H02G 3/088 |
| | | 174/488 |
| 7,166,798 B2 | 1/2007 | Cole |
| 7,183,501 B2 | 2/2007 | Bowman |
| 7,183,503 B2 | 2/2007 | Bowman et al. |
| 7,271,351 B2 | 9/2007 | Drane |
| 7,285,733 B2 | 10/2007 | Bowman |
| 7,319,193 B2 | 1/2008 | Halterman |
| 7,388,164 B2 * | 6/2008 | Scanzillo ............... H02G 3/185 |
| | | 174/50 |
| 7,459,632 B2 | 12/2008 | Bowman |
| 7,635,110 B2 | 12/2009 | Galasso et al. |
| 7,645,937 B2 * | 1/2010 | Bhosale ................. H02G 3/123 |
| | | 174/50 |
| 7,795,544 B2 * | 9/2010 | Peck ...................... H02G 3/185 |
| | | 174/53 |
| 8,013,242 B1 | 9/2011 | Thibault et al. |
| 8,022,297 B1 | 9/2011 | Thibault |
| 8,063,317 B2 | 11/2011 | Bowman |
| 8,119,912 B2 | 2/2012 | Thibault et al. |
| 8,242,365 B2 | 8/2012 | Galasso et al. |
| 8,420,931 B2 * | 4/2013 | Soh ..................... B60R 16/0238 |
| | | 174/50 |
| 8,878,058 B2 | 11/2014 | Wurms et al. |
| 9,148,007 B2 | 9/2015 | Drane |
| 9,385,515 B2 | 7/2016 | Galasso et al. |
| 9,490,616 B1 | 11/2016 | Galasso et al. |
| 9,537,295 B2 * | 1/2017 | Dinh ...................... H02G 3/088 |
| 9,627,871 B2 | 4/2017 | Bowman et al. |
| 9,653,897 B2 | 5/2017 | Hemingway et al. |
| 9,653,900 B2 | 5/2017 | Hemingway et al. |
| 9,673,598 B2 | 6/2017 | DeBartolo, Jr. et al. |
| 9,692,219 B2 | 6/2017 | Galasso et al. |
| 9,960,585 B2 | 5/2018 | Galasso et al. |
| 10,020,645 B2 | 7/2018 | Hemingway et al. |
| 10,069,289 B2 | 9/2018 | Callahan et al. |
| 10,320,171 B1 | 6/2019 | Galasso et al. |
| 10,439,378 B2 | 10/2019 | Richards et al. |
| 10,530,140 B2 | 1/2020 | Drane |
| 11,088,523 B1 * | 8/2021 | Gretz ..................... H02G 3/088 |
| 2005/0126809 A1 | 6/2005 | Drane et al. |
| 2020/0036174 A1 | 1/2020 | Diakomis et al. |
| 2020/0052432 A1 | 2/2020 | Byrne et al. |
| 2020/0052471 A1 | 2/2020 | Byrne et al. |

* cited by examiner

POKE-THROUGH FLOOR FITTING

BACKGROUND OF THE DISCLOSURE

Field of the Disclosure

The present disclosure relates to electrical fittings and, more particularly, to poke-through floor box assemblies.

Discussion of Related Art

In-floor fittings such as poke-thru fittings, afterset fittings, and preset fittings, are often installed in concrete floors to provide electrical receptacles and communication/data receptacles (or jacks) at desired locations in buildings. Poke-thru fittings are further designed to be installed in an opening in a floor, such as a concrete slab or steel deck, in a commercial building structure to provide electrical receptacles and/or communication/data receptacles at desired locations. In some poke-thru fittings, source power and signal cables may be pulled from a plenum and connected with or passed through the poke-thru fitting for activation of services. In some cases, high-voltage source power cables are connected with power receptacles that may be mounted within the poke-thru fitting or surface mounted on the floor above the fitting. Lower voltage communication/data signal cables may also be passed through the poke-thru fitting and/or mounted within the fitting.

Access doors of many in-floor fittings upwardly protrude above the surface of the floor when electrical and communications devices within the fittings are operatively connected to an above-floor system. Such protrusions may be aesthetically unpleasant and may also pose tripping hazards. Furthermore, in-floor fittings are susceptible to fluid (e.g., water) ingress, which may result in damage to the power receptacles or other data communication ports within the fitting.

Thus, a need exists for a poke-thru assembly that addresses the problems described above.

SUMMARY OF THE DISCLOSURE

In one approach, an assembly may include a main housing including a central cavity, wherein the central cavity is operable to house an electrical wiring device, and a cover assembly coupled to the main housing. The cover assembly may include a frame including a sidewall and a fluid channel extending through the sidewall, and a set of main doors rotatably coupled to the frame, wherein a first main door of the set of main doors includes a cable access door.

In another approach, a poke-through floor box assembly may include a main housing including a central cavity, wherein the central cavity is operable to house an electrical wiring device, and a cover assembly coupled to an outer wall of the main housing. The cover assembly may include a frame including a sidewall and a fluid channel, wherein the fluid channel is located within the central cavity, and wherein the fluid channel extends through the sidewall. The cover assembly may further include a set of main doors rotatably coupled to the frame, wherein a first main door of the set of main doors includes a cable access door, and wherein the cable access door is rotatably coupled to the first main door.

In yet another approach, a cover assembly of a poke-through floor box assembly may include a frame including a sidewall surrounding an interior, and a ledge extending into the interior from the sidewall, wherein the ledge includes a fluid channel recessed into an upper surface of the ledge, and wherein the fluid channel has an outlet extending through the sidewall. The cover assembly may further include a set of main doors rotatably coupled to the sidewall, wherein a first main door of the set of main doors includes a cable access door, and wherein the cable access door is rotatably coupled to the first main door.

BRIEF DESCRIPTION OF THE DRAWINGS

The accompanying drawings illustrate exemplary approaches of the disclosed armored cable assembly so far devised for the practical application of the principles thereof, and in which.

Figure 1:
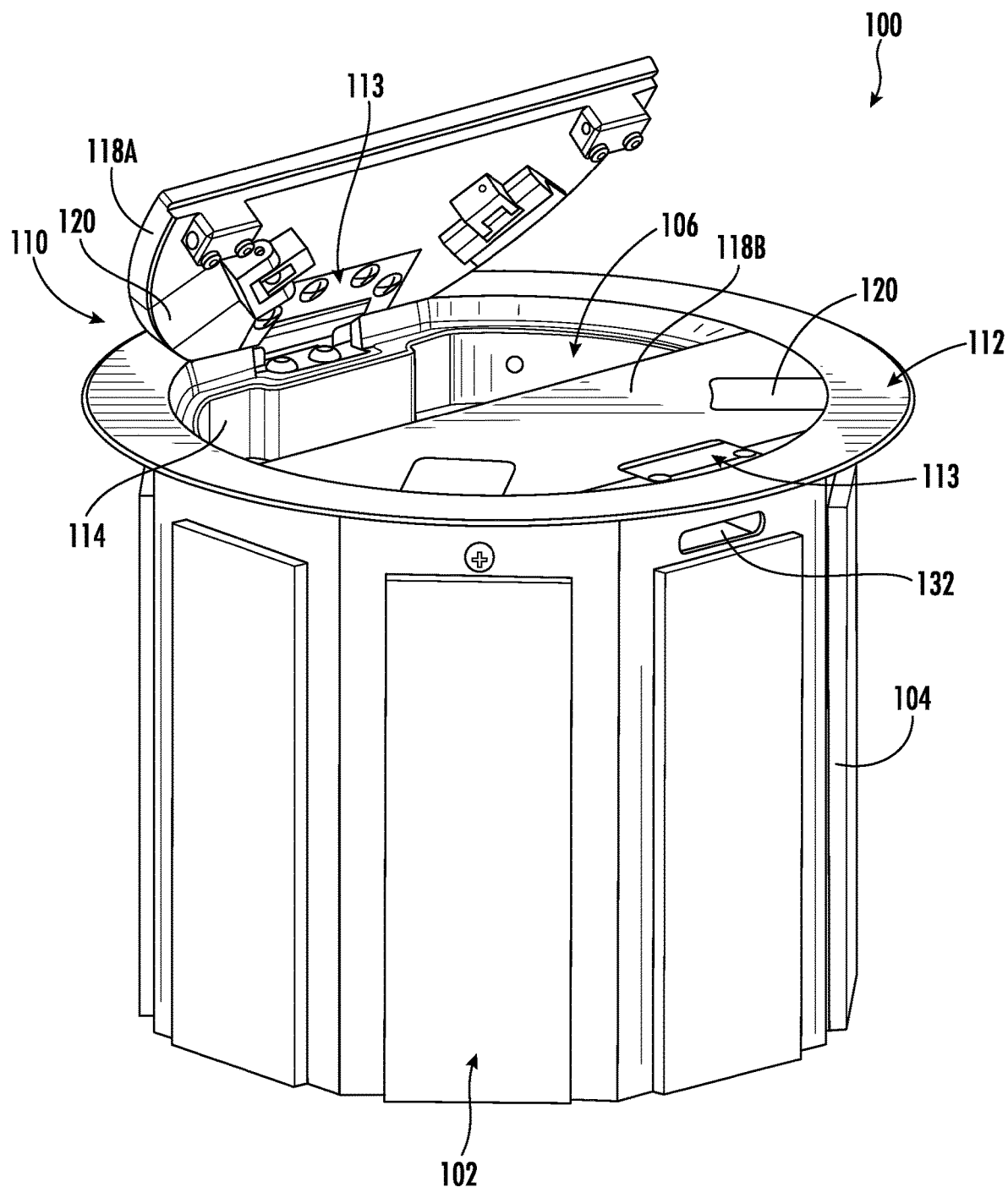
FIG. 1 is a side perspective view of a poke-through floor box assembly according to embodiments of the present disclosure.

The drawings are not necessarily to scale. The drawings are merely representations, not intended to portray specific parameters of the disclosure. The drawings are intended to depict exemplary embodiments of the disclosure, and therefore are not to be considered as limiting in scope. In the drawings, like numbering represents like elements.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, for clarity, some reference numbers may be omitted in certain drawings.

DESCRIPTION OF EMBODIMENTS

The present disclosure will now proceed with reference to the accompanying drawings, in which various approaches are shown. It will be appreciated, however, that the disclosed poke-through floor box assemblies may be embodied in many different forms and should not be construed as limited to the approaches set forth herein. Rather, these approaches are provided so that this disclosure will be thorough and complete, and will fully convey the scope of the disclosure to those skilled in the art. In the drawings, like numbers refer to like elements throughout.

To address the above identified drawbacks of the prior art, embodiments of the present disclosure provide an improved poke-through floor box design including a main housing defining a central cavity, and a cover assembly including a frame having a sidewall and a fluid channel extending through the sidewall. The central cavity of the main housing is operable to house an electrical wiring device, such as one or more electrical/data receptacles, while the cover assembly includes a set of main doors rotatably coupled to the frame to provide access to the electrical wiring device within the central cavity. In some embodiments, a first main door of the set of main doors includes a cable access door. During use, the fluid channel may extend through the frame of the cover assembly and through the main housing to remove a fluid (e.g., water) from the central cavity. Embodiments of the present disclosure further make it less likely for the main doors and/or the cable access door to be broken off, while also making it easier to access and connect cords or wiring to the electrical wiring device.

Figure 2:
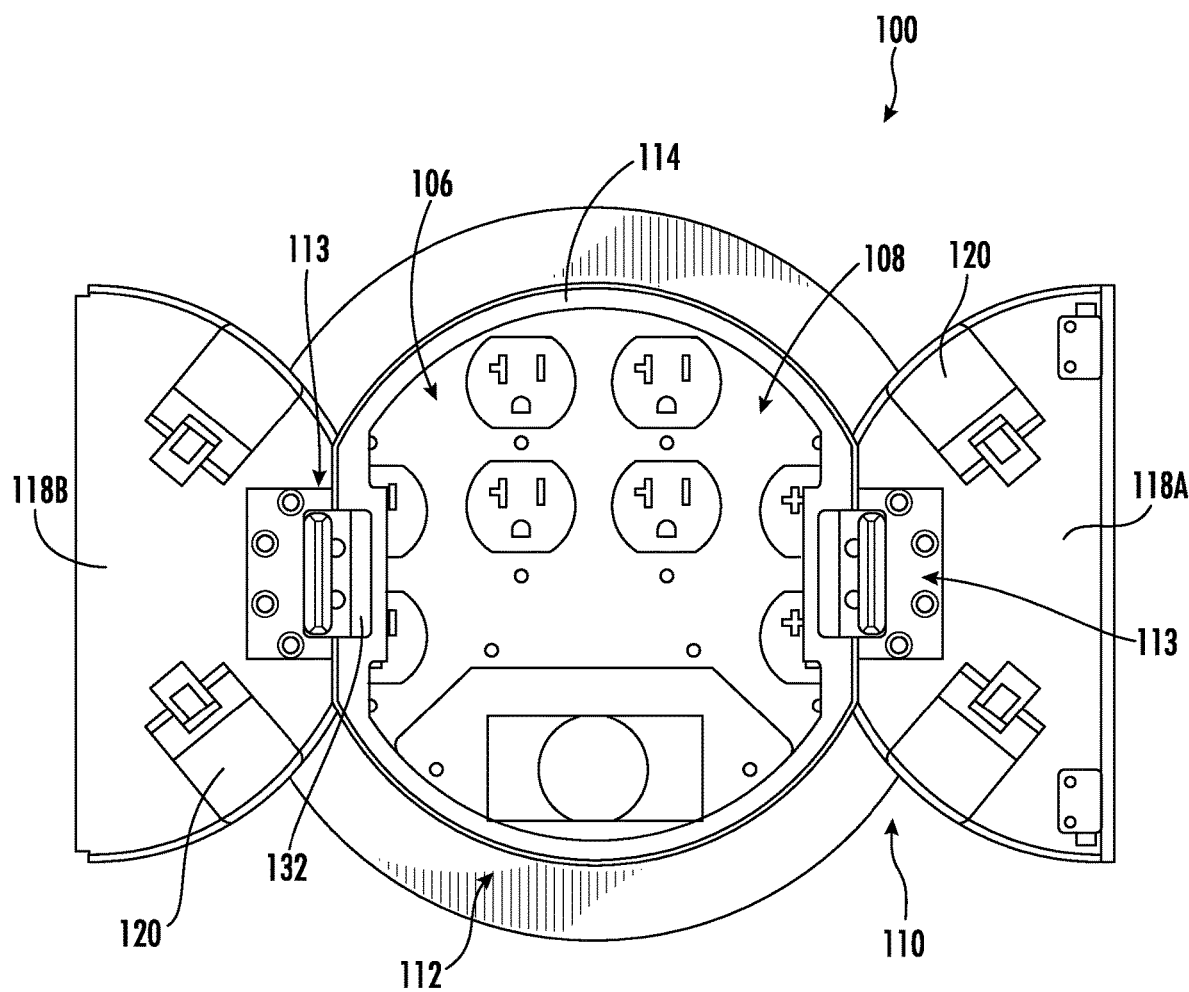
FIG. 2 is a top view of the poke-through floor box assembly according to embodiments of the present disclosure.

Referring now to FIGS. 1-2, an exemplary poke-through floor box assembly (hereinafter "assembly") 100 according to embodiments of the present disclosure will be described in greater detail. As shown, the assembly 100 may include a main housing 102 including an outer wall 104 surrounding a central cavity 106. As better demonstrated in FIG. 2, the central cavity 106 is operable to house an electrical and/or data wiring device 108. Embodiments herein are not limited to any particular type of electrical or communication wiring interface device 108.

The assembly 100 may further include a cover assembly (hereinafter "cover") 110 coupled to the main housing 102. As will be described in greater detail herein, the cover 110 may include a frame 112 including a sidewall 114 and a fluid channel 132 extending through the sidewall 114. The sidewall 114 of the frame 112 may be coupled to the outer wall 104 of the main housing 102. The cover 110 may further include a set of main doors 118A, 118B rotatably coupled to the frame 112, wherein the set of main doors 118A, 118B may open and close to provide full access to the electrical wiring device 108. Each of the main doors 118A, 118B may be rotatably coupled to frame 112 by a hinge 113. As further shown, the main doors 118A, 118B may each include one or more cable access doors 120. As will be described in greater detail herein, the cable access doors 120 are rotatably coupled to the main doors 118A, 118B to provide access for one or more cables or wires.

Figure 3:
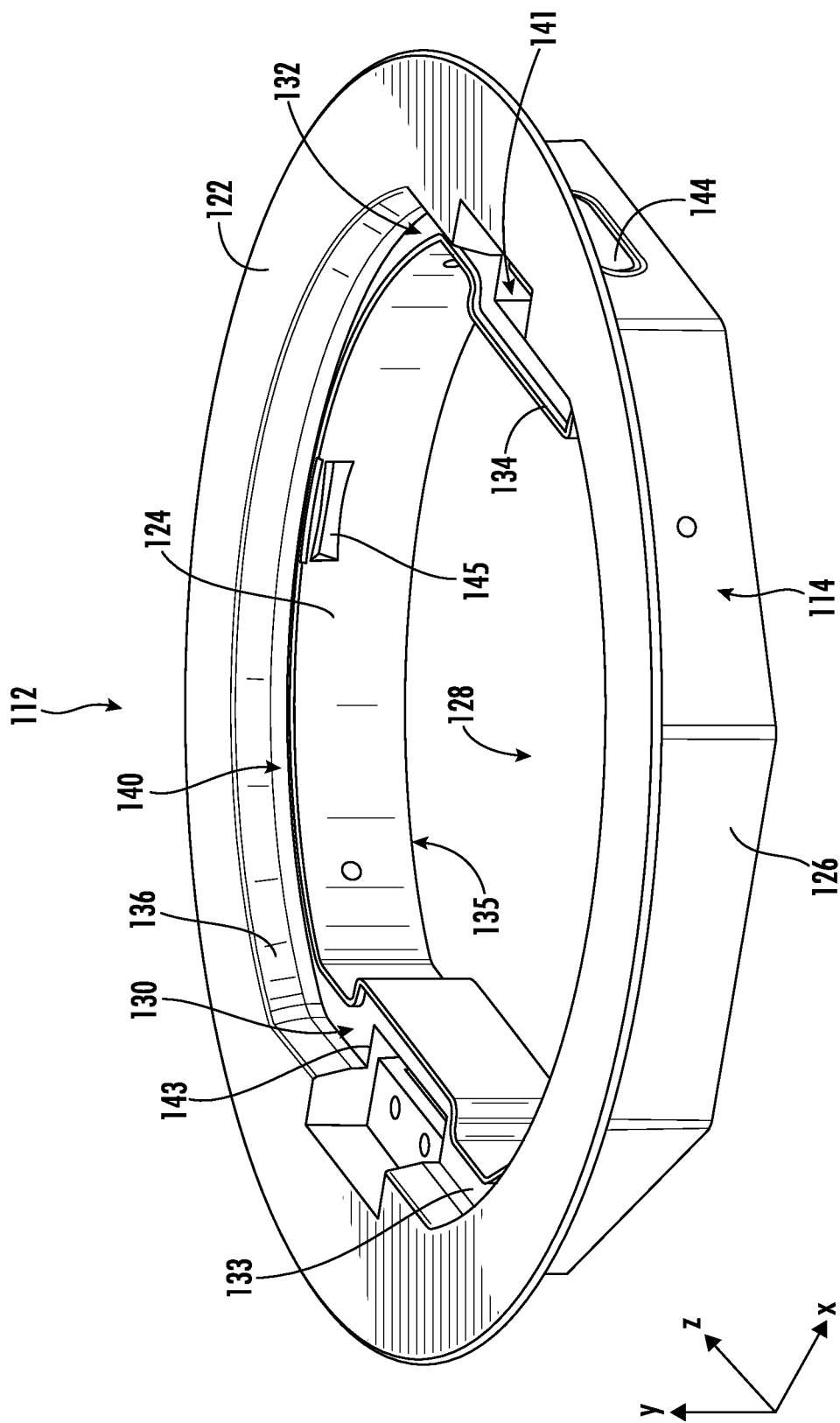
FIG. 3 is a side perspective view of a cover assembly of the poke-through floor box assembly according to embodiments of the present disclosure.

FIG. 3 depicts the frame 112 of the cover 110 in greater detail. As shown, the frame 112 may include the sidewall 114 and an upper flange 122 extending from the sidewall 114. When the assembly 100 is installed, e.g., in a floor of a building, the upper flange 122 may be generally flush, or co-planar, with the floor. Furthermore, the upper flange 122 may be generally flush or co-planar with the main doors 118A, 118B (FIGS. 1-2) when the main doors 118A, 118B are closed. The sidewall 114 may include an inner surface 124 opposite an outer surface 126, wherein the inner surface 124 may define an interior 128 of the frame 112. In some embodiments, the outer surface 126 of the sidewall 114 may be in direct contact with an interior surface of the main housing 102.

As further shown, the frame 112 may include a ledge 130 extending into the interior 128 from the sidewall 114. In some embodiments, the ledge 130 may define a fluid channel 132 recessed into an upper surface 133 of the ledge 130, and wherein the fluid channel 132 has an outlet or exit 144 extending through the sidewall 114. The fluid channel 132 may be defined in part by an inner rim 134 and a vertical wall 136, which extends between the upper flange 122 and the upper surface 133. In some embodiments, the fluid channel 132 may extend entirely around an inner perimeter 135 of the frame 112. In other embodiments, the fluid channel 132 may extend only partially around the inner perimeter 135.

The fluid channel 132 may include a first section 140, which may correspond generally to the upper surface 133, and a second section 141 connected with the first section 140. In some embodiments, the second section 141 may include a cavity or gully extending in a y-direction (in the orientation shown) from an edge 143 of the first section 140. The second section 141 may terminate at the exit 144, which extends through the sidewall 114. As shown, the edge 143 may extend around an upper perimeter of the gully. When the frame 112 is installed, fluid that may enter the assembly 100 is directed into the first section 140 of the fluid channel 132 and then into the second section 141 of the fluid channel 132 until it is expelled via the exit 144. The fluid channel 132 therefore provides a path to prevent fluid from reaching the electrical device 108.

Figure 4:
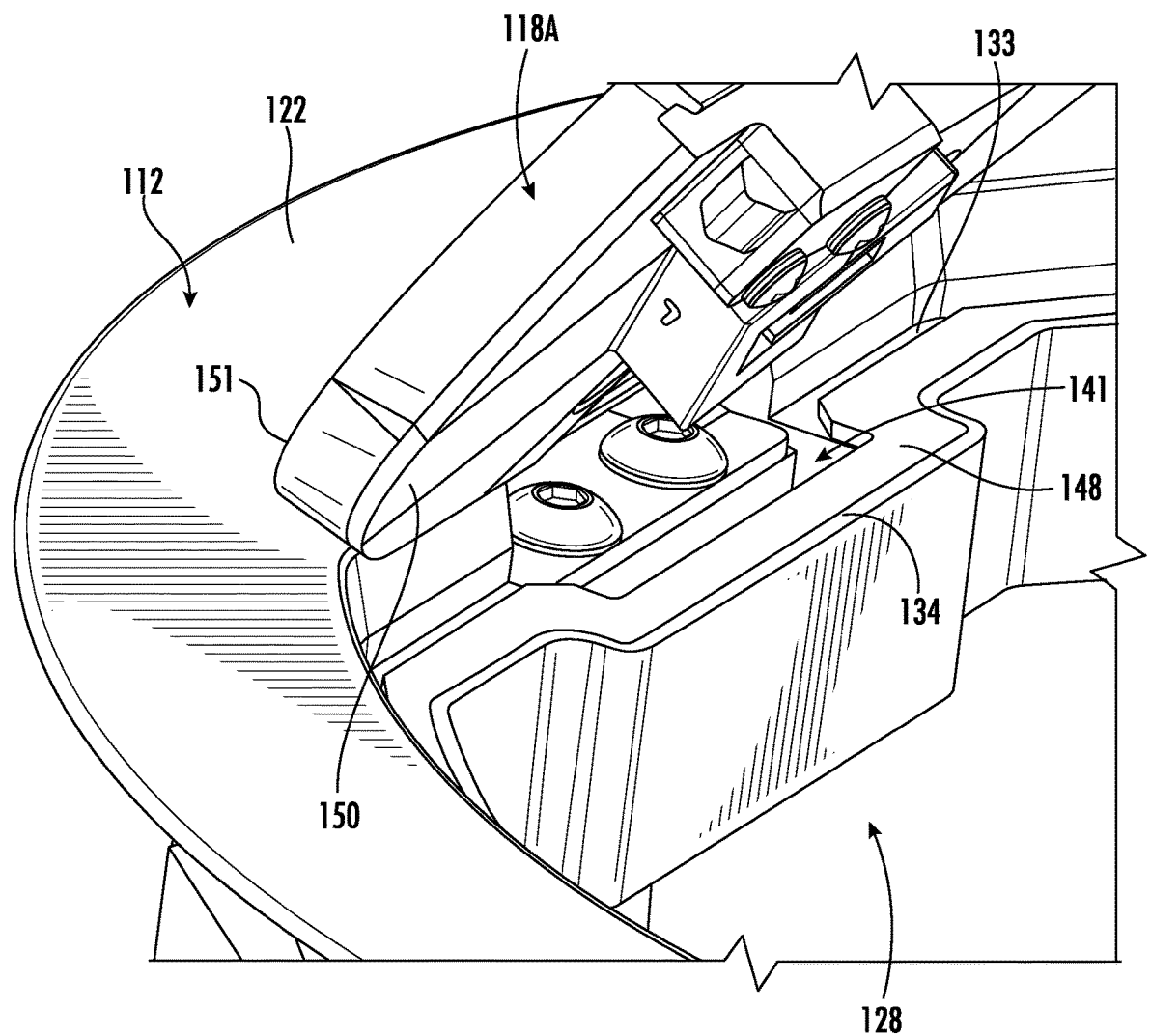
FIGS. 4-5 are perspective views of the cover assembly of the poke-through floor box assembly according to embodiments of the present disclosure.

In some embodiments, as shown in FIG. 4, the frame 112 may include a fluid channel sealing member 148 within the fluid channel 132. More specifically, the fluid channel sealing member 148 may be placed atop the upper surface 133, against the inner rim 134. When the main doors 118A, 118B are closed, an inner surface 150 of the main doors 118A, 118B may be in direct contact with an upper surface of the fluid channel sealing member 148 to create a liquid tight seal therebetween. Any fluid that may enter the frame 112, e.g., between an outer border 151 of the main doors 118A, 118B and the flange 122, is directed along the vertical wall 136 towards the upper surface 133. The fluid channel sealing member 148 helps direct the fluid towards the second section 141 of the fluid channel 132 and prevents the fluid from entering the interior 128 of the frame 112. In various embodiments, the fluid channel sealing member 148 may be made from a variety of materials including, but not limited to, nitrile, neoprene, ethylene propylene, silicone, fluorocarbon, polytetrafluoroethylene, and others.

Figure 5:
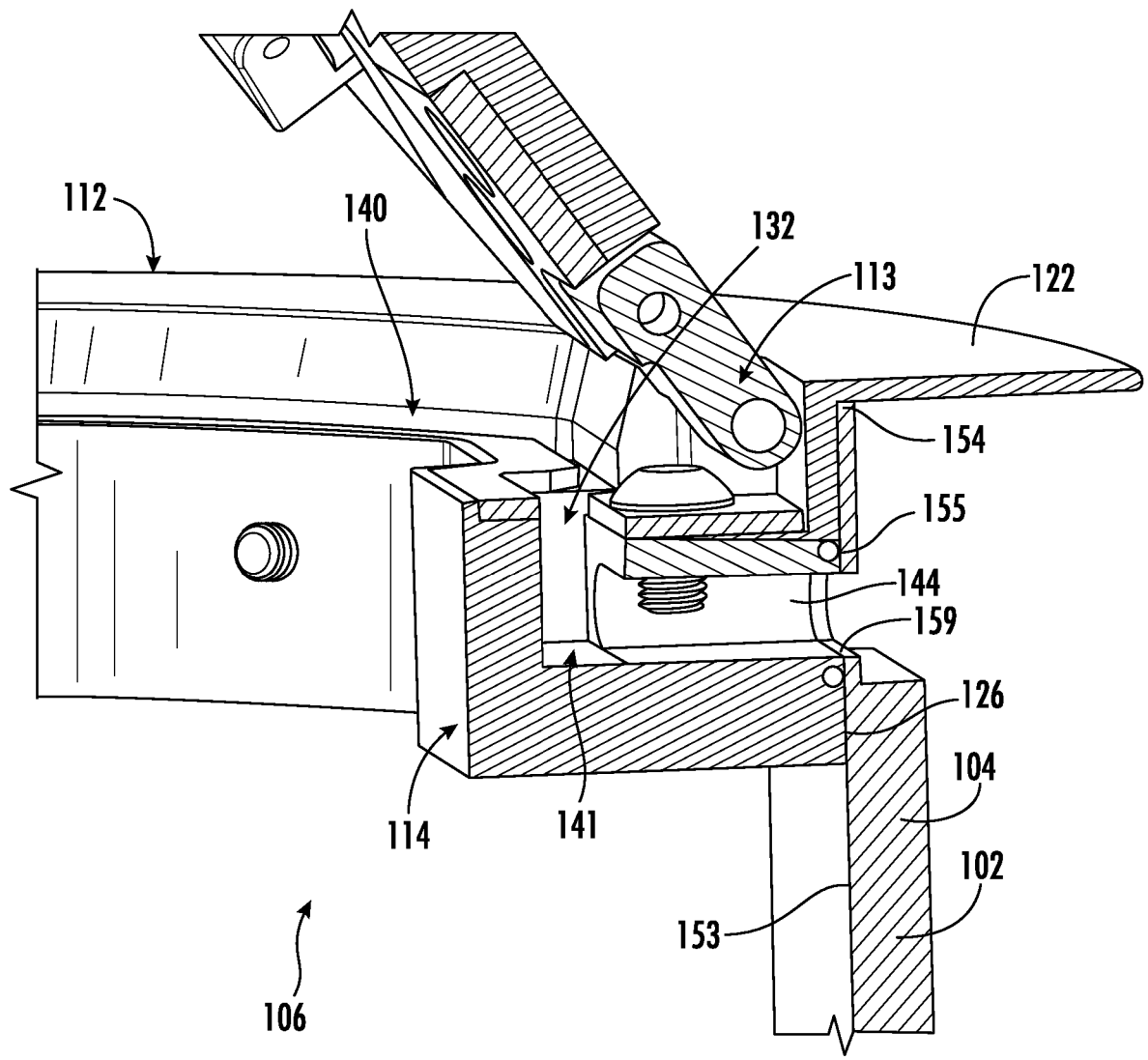

FIG. 5 demonstrates the fluid channel 132 in greater detail. As shown, the outer surface 126 of the sidewall 114 of the frame 112 may be in direct contact with an interior surface 153 of the outer wall 104 of the main housing 102. When the frame 112 is inserted within the central cavity 106 of the main housing 10, the flange 122 of the frame 112 may engage an upper rim 154 of the outer wall 104 and the exit 144 of the fluid channel 132 may be aligned with an outer wall opening 159 of the outer wall 104. In some embodiments, one or more sealing members 155 may be positioned above and below the fluid channel 132 to provide a liquid tight seal between the frame 112 and the outer wall 104. Although not limited to any particular configuration, the second section 141 of the fluid channel 132 may include a first vertical portion connected to the first section 140, and a horizontal portion extending between the vertical portion and the exit 144. As shown, the second section 141 of the fluid channel 132 may travel beneath the hinge 113. Embodiments herein are not limited in this context, however.

Figure 6A:
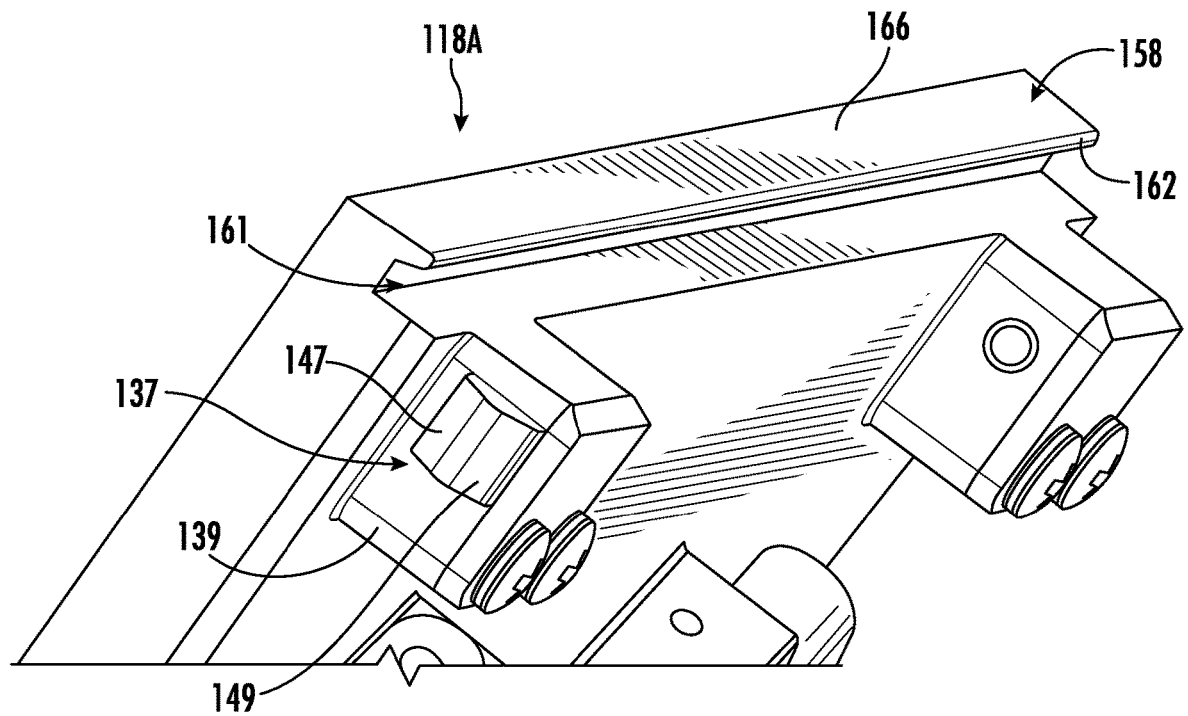
FIGS. 6A-6B demonstrate a set of main doors of the cover assembly according to embodiments of the present disclosure.
Figure 6B:
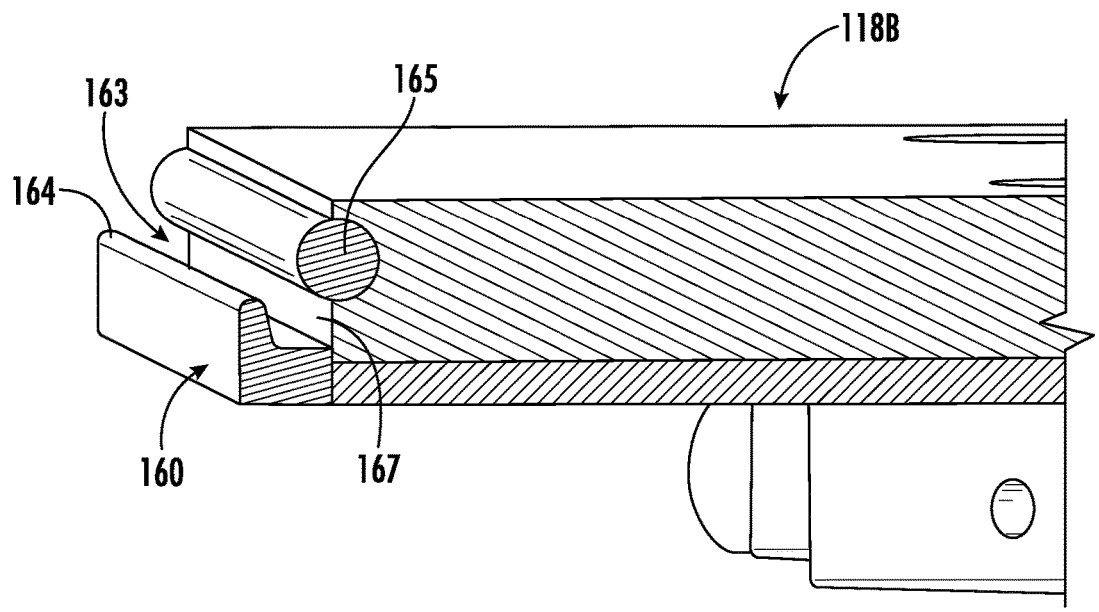

FIGS. 6A-6B demonstrate the set of main doors 118A, 118B in greater detail. As shown, the first main door 118A may include first free end 158 operable to engage a second free end 160 of the second main door 118B. The first free end 158 may include a first recess 161 and a first rim 162. Similarly, the second main door 118B may include a second recess 163 and a second rim 164, wherein the first rim 162 is configured to extend into, and next within, the second recess 163 when the first and second main doors 118A, 118B are in the closed position. The second rim 164 may likewise be configured to extend into the first recess 161.

As further shown, the first main door 118A and/or the second main door 118B may include a sealing member to create a liquid tight seal between the first free end 158 and the second free end 160 when the first and second main doors 118A, 118B are in the closed position. For example, a main door sealing member 165 of the second main door 118B may extend partially across the second recess 163 for engagement with an outer face 166 of the first free end 158 of the first main door 118A. Although non-limiting, the main door sealing member 165 may be partially recessed within an interior face 167 of the second main door 118B. The main door sealing member 165 may be made from a variety of materials including, but not limited to, nitrile, neoprene, ethylene propylene, silicone, fluorocarbon, polytetrafluoroethylene, and others.

As further shown in FIG. 6A, one or both of the set of main doors 118A, 118B may include a closing tab 137 extending from a fastener block 139, wherein the closing tab 137 is operable to engage a recess 145 (FIG. 3) along the inner surface 124 of the frame 112 to help maintain the set of main doors 118A, 118B in the closed position. Although non-limiting, the closing tab 137 may include a first angled surface 147 and a second angled surface 149 each operable to engage the frame 112 as the set of main doors 118A, 118B open and close. In some embodiments, the closing tab 137 may be spring loaded, wherein engagement between the closing tab 137 and the inner surface 124 of the frame 112 causes the closing tab 137 to be depressed into an interior of the fastener block 139 until the closing tab 137 is aligned with the recess 145.

Figure 7:
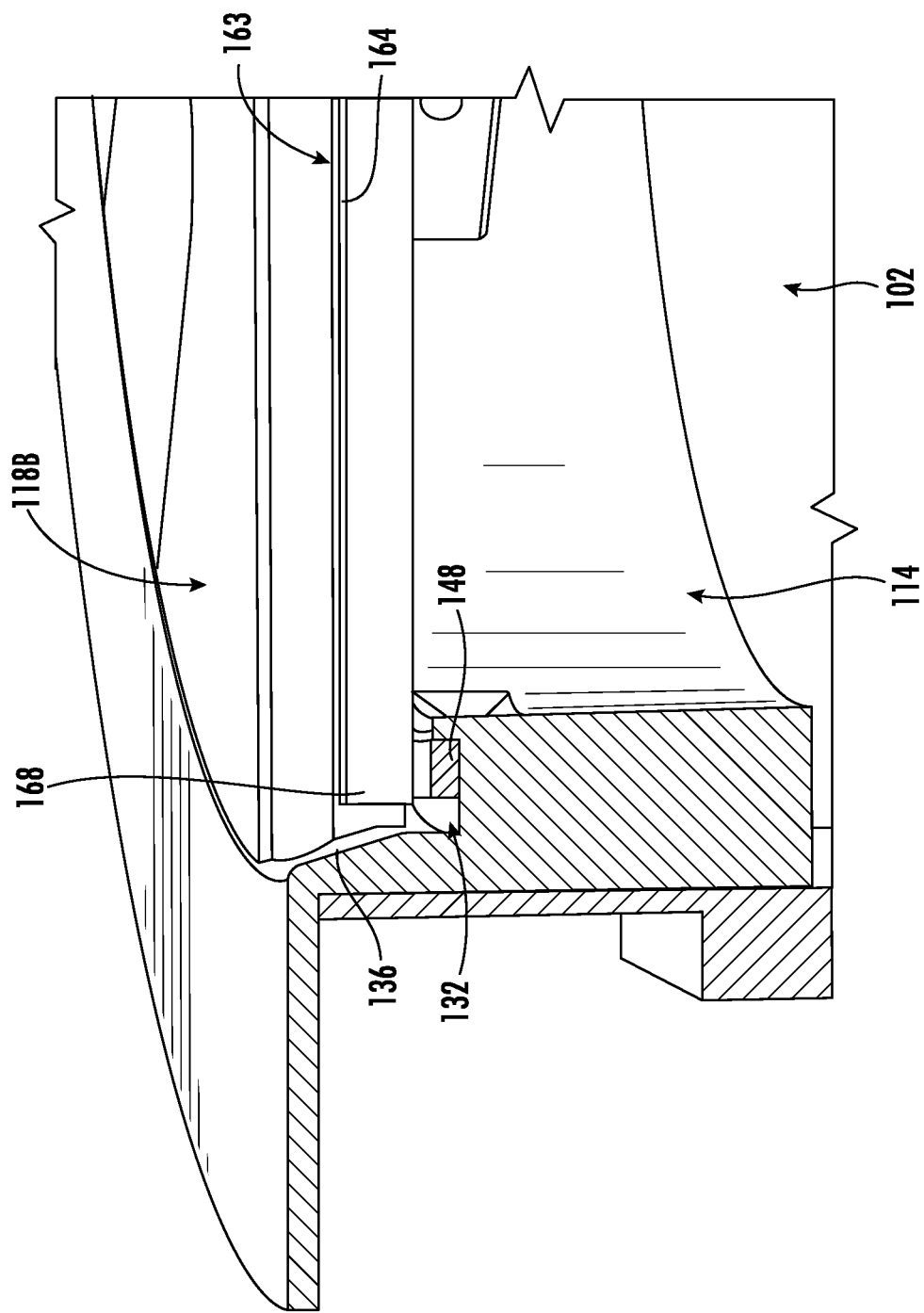
FIG. 7 is a perspective view of the set of main doors of the cover assembly according to embodiments of the present disclosure.

As demonstrated in FIG. 7, the second recess 163 of the second main door 118B may be fluidly connected with the fluid channel 132 of sidewall 114 of the frame 112. Should any fluid penetrate the interface between the first free end 158 and the second free end 160 of the first and main door 118A and the second main door 118B, respectively, the fluid will collect in the second recess 163 and be delivered to the fluid channel 132. In some embodiments, a gap may be present between an end 168 of the second rim 164 and the vertical wall 136 of the fluid channel 132 to ensure a pathway for the fluid to be delivered into the fluid channel 132. As further shown, the end 168 of the second rim 164 may extend beyond the fluid channel sealing member 148.

Figure 8:
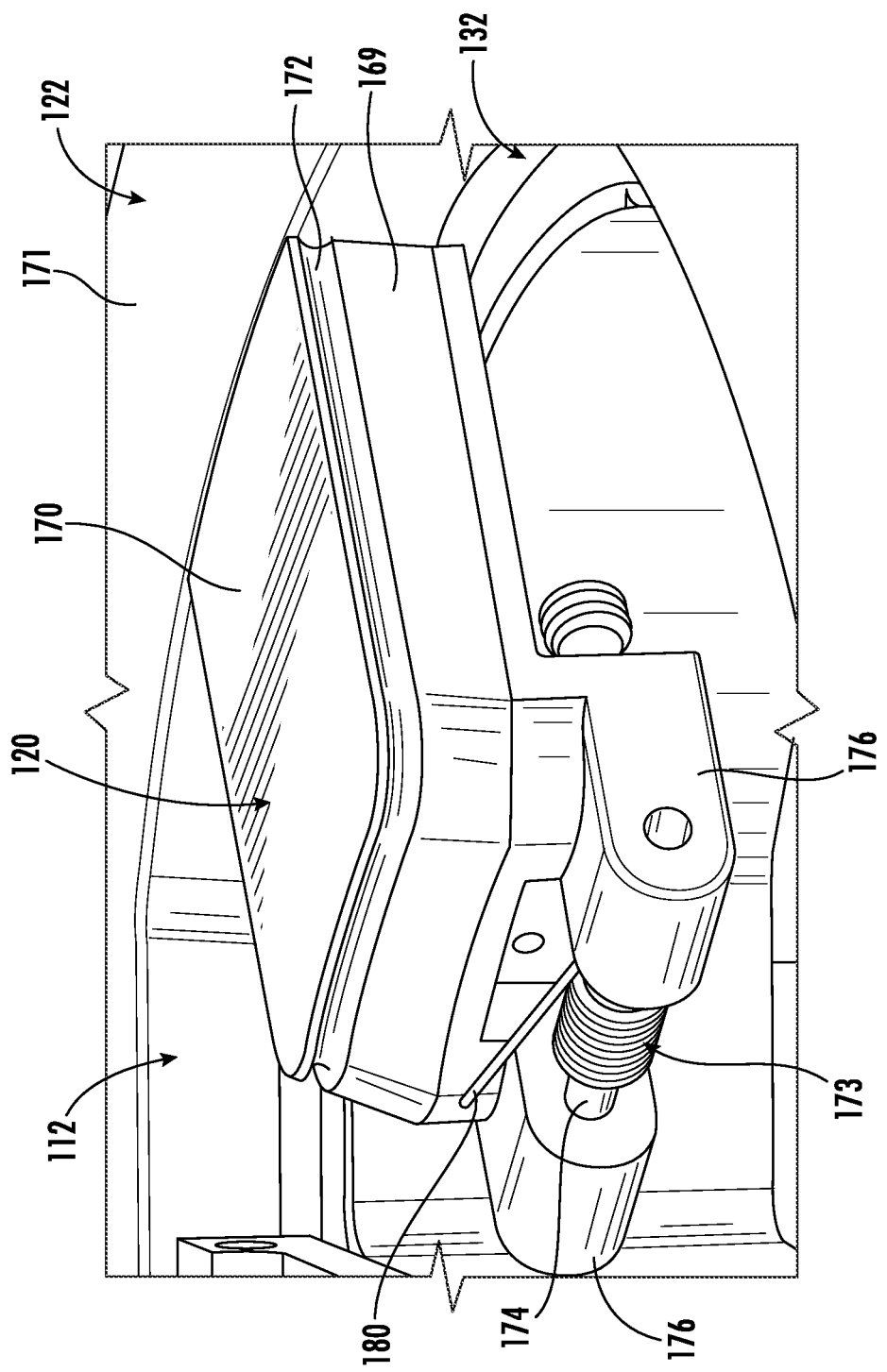
FIGS. 8-10 demonstrate a set of cable access doors of the cover assembly according to embodiments of the present disclosure.
Figure 9:
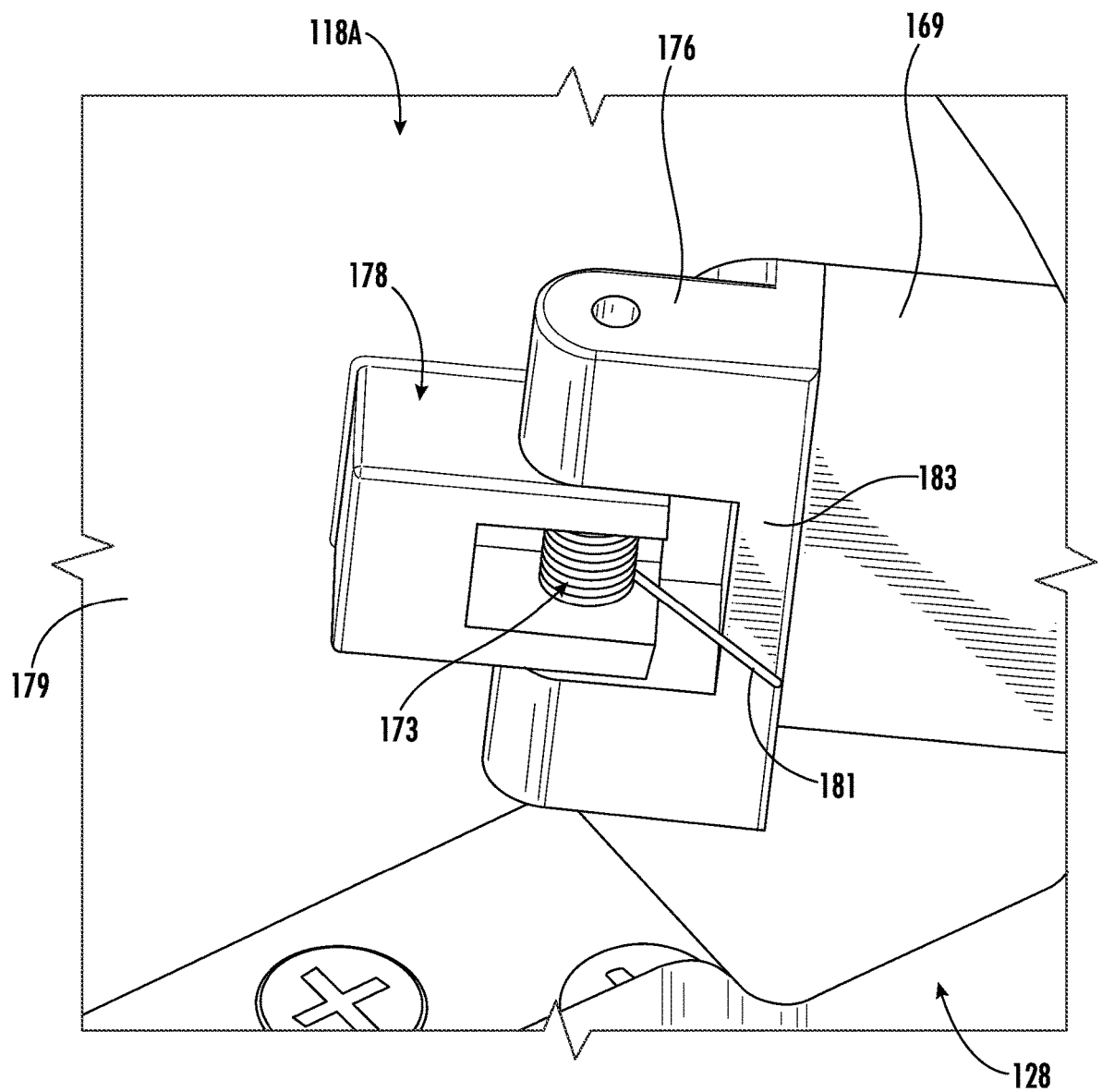
Figure 10:
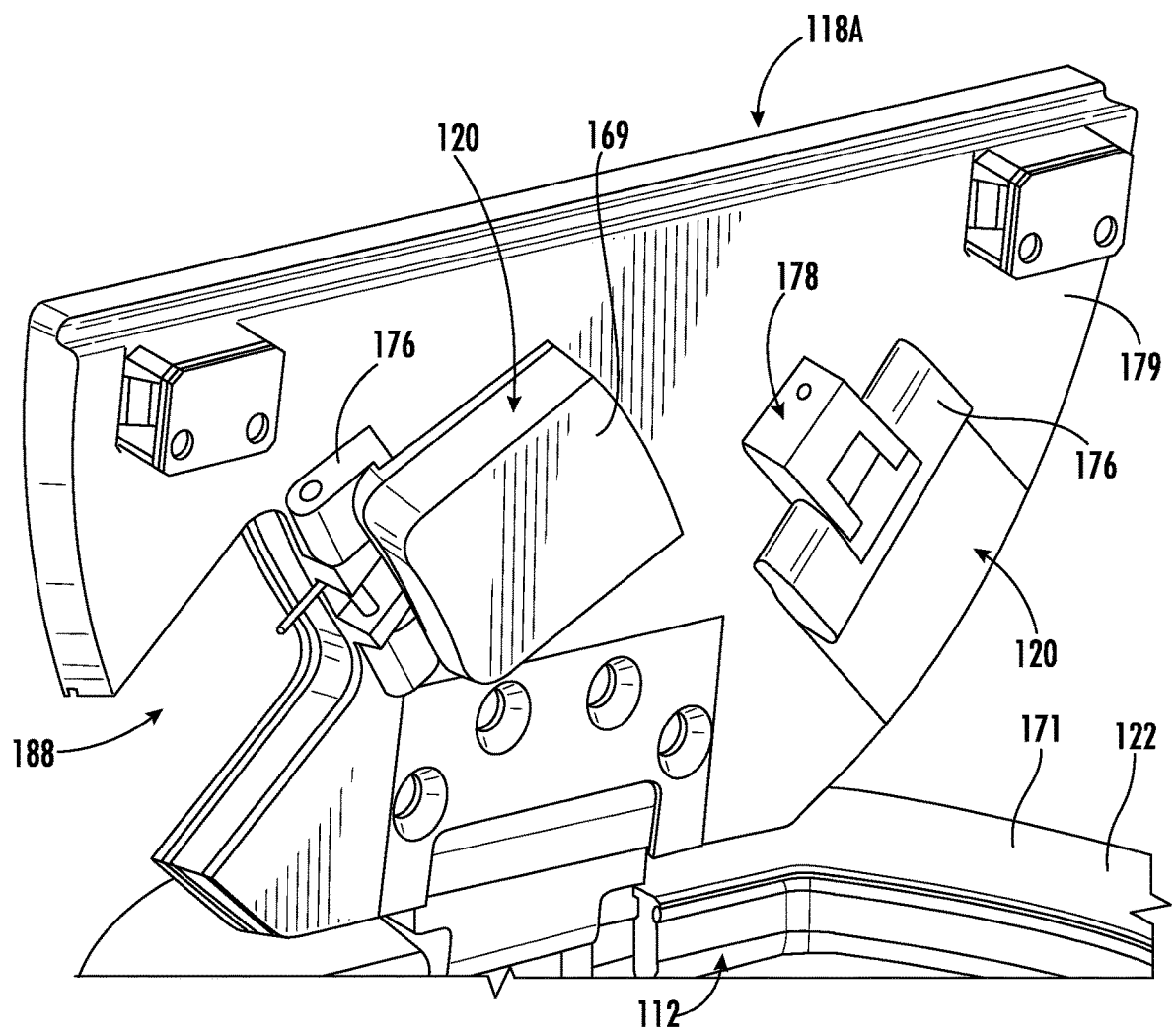

Turning now to FIGS. 8-10, the cable access doors 120 according to embodiments of the present disclosure will be described in greater detail. FIG. 8 demonstrates one of the cable access doors 120 with the main door(s) 118A, 118B removed for ease of viewing. As shown, the cable access door 120 may include a main body 169 having an outer surface 170 operable to extend through a cable access opening 188 (FIG. 10) of the set of main doors 118A, 118B, wherein the outer surface 170 is co-planar with an outer surface of the set of main doors 118A, 118B when the cable access door 120 is in a closed position. As further shown, the outer surface 170 may be generally planar with an upper surface 171 of the flange 122 of the frame 112.

In some embodiments, the cable access door 120 may include a perimeter channel 172 extending around the outer surface 170. In some embodiments, the perimeter channel 172 is fluidly connected with the fluid channel 132 of the sidewall 114 when the cable access door 120 is in a closed position and when the set of main doors 118A, 118B are in the closed position. Should any fluid penetrate the interface between the cable access door 120 and the set of main doors 118A, 18B, the fluid will be funneled to the fluid channel 132.

As further shown in FIGS. 8-10, connected with the main body 169 may be a set of arms 176 and a shaft 174, wherein a biasing device, such as a torsion spring 173, is wrapped around the shaft 174. It will be appreciated that a variety of biasing devices may be employed. In some embodiments, a spring support 178 may be coupled to an interior surface 179 of the first and second main doors 118A, 118B, wherein the shaft 174 may also extend through openings of the spring support 178. A first leg or free end 180 (FIG. 8) of the torsion spring 173 may be in direct contact with the interior surface 179 of the first main door 118A, while a second leg or free end 181 (FIG. 9) of the torsion spring 173 may extend into the interior 128 of the frame 112. During use, each of the cable access doors 120 may be rotatably coupled to the set of main doors 118A, 118B, e.g., between the closed position demonstrated in FIGS. 8-9, and the open position demonstrated in FIG. 10. When the cable access doors 120 are opened, the second free end 181 of the torsion spring 173 may apply a force against an underside 183 of the set of arms 176 to bias the cable access doors 120 towards the closed position. As shown, when in the open position, the cable access doors 120 may rotate into the interior 128 of the frame 112.

Although not shown, in some embodiments, the assembly 100 may include a fire-retarding material, generally intumescent material, to slow the transmission of heat and flame from a fire in the assembly 100. The intumescent material may be activated upon exposure to a fire's heat and flames, rising through the floor opening from a fire below the floor. The intumescent material absorbs the heat and expands to fill open spaces in the floor.

The foregoing discussion has been presented for purposes of illustration and description and is not intended to limit the disclosure to the form or forms disclosed herein. For example, various features of the disclosure may be grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

The use of "including," "comprising," or "having" and variations thereof herein is meant to encompass the items listed thereafter and equivalents thereof as well as additional items. Accordingly, the terms "including," "comprising," or "having" and variations thereof are open-ended expressions and can be used interchangeably herein.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Furthermore, identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary.

The terms "substantial" or "substantially," as well as the terms "approximate" or "approximately," can be used interchangeably in some embodiments, and can be described using any relative measures acceptable by one of ordinary skill in the art. For example, these terms can serve as a comparison to a reference parameter, to indicate a deviation capable of providing the intended function. Although non-limiting, the deviation from the reference parameter can be, for example, in an amount of less than 1%, less than 3%, less than 5%, less than 10%, less than 15%, less than 20%, and so on.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, the present disclosure has been described herein in the context of a particular implementation in a particular environment for a particular purpose. Those of ordinary skill in the art will recognize the usefulness is not limited thereto and the present disclosure may be beneficially implemented in any number of environments for any number of purposes. Thus, the claims set forth below are to be construed in view of the full breadth and spirit of the present disclosure as described herein.

What is claimed is:

1. An assembly, comprising:
   a main housing including a central cavity, wherein the central cavity is operable to house an electrical wiring device; and
   a cover assembly coupled to the main housing, the cover assembly comprising:
      a frame including a sidewall and a fluid channel extending through the sidewall, wherein an exit of the fluid channel is aligned with an outer wall opening of an outer wall of the main housing; and
      a set of main doors rotatably coupled to the frame, wherein a first main door of the set of main doors includes a cable access door.

2. The assembly of claim 1, wherein the outer wall includes an outer surface opposite an inner surface, wherein the frame of the cover assembly is coupled to the outer surface or the inner surface of the outer wall.

3. The assembly of claim 1, wherein the fluid channel comprises:
   a first section extending around an inner perimeter of the frame; and
   a second section extending between the first section and the exit of the fluid channel.

4. The assembly of claim 1, wherein the frame further comprises an upper flange extending from the sidewall, wherein the upper flange is co-planar with the set of main doors when the set of main doors are in a closed position.

5. The assembly of claim 4, wherein the first main door of the set of main doors comprises a first recess and a first rim, wherein a second main door of the set of main doors comprises a second recess and a second rim, wherein the first rim is configured to extend into the second recess when the set of main doors are in the closed position, and wherein the second rim is configured to extend into the first recess when the set of main doors are in the closed position.

6. The assembly of claim 5, further comprising a main door sealing member extending into the second recess, wherein the second recess is fluidly connected with the fluid channel when the set of main doors are in the closed position.

7. The assembly of claim 1, wherein the cover assembly comprises a biasing device coupled to the first main door of the set of main doors and to the cable access door.

8. The assembly of claim 7, further comprising a spring support coupled to an interior surface of the first main door of the set of main doors, wherein the biasing device is a torsion spring extending around a shaft of the spring support.

9. The assembly of claim 1, wherein the cable access door comprises:
   an outer surface extending through a cable access opening, wherein the outer surface is co-planar with an outer surface of the set of main doors when the cable access door is in a closed position; and
   a perimeter channel extending around the outer surface, wherein the perimeter channel is fluidly connected with the fluid channel when the cable access door is in the closed position and when the set of main doors are in a closed position.

10. A poke-through floor box assembly, comprising:
    a main housing including a central cavity, wherein the central cavity is operable to house an electrical wiring device; and
    a cover assembly coupled to an outer wall of the main housing, the cover assembly comprising:
       a frame including a sidewall and a fluid channel, wherein the fluid channel is located within the central cavity, wherein the fluid channel extends through the sidewall, and wherein an exit of the fluid channel is aligned with an outer wall opening of an outer wall of the main housing; and
       a set of main doors rotatably coupled to the frame, wherein a first main door of the set of main doors includes a cable access door, and wherein the cable access door is rotatably coupled to the first main door.

11. The poke-through floor box assembly of claim 10, wherein the outer wall includes an outer surface opposite an inner surface, wherein the frame of the cover assembly is coupled to the inner surface.

12. The poke-through floor box assembly of claim 10, wherein the fluid channel comprises:
    a first section extending around an inner perimeter of the frame; and
    a second section extending between the first section and the exit of the fluid channel, wherein the first section and the second section deliver a fluid from the central cavity to an exterior of the main housing.

13. The poke-through floor box assembly of claim 10, wherein the frame further comprises an upper flange extending from the sidewall, wherein the upper flange is co-planar with the set of main doors when the set of main doors are in a closed position.

14. The poke-through floor box assembly of claim 13, wherein the first main door of the set of main doors comprises a first recess and a first rim, wherein a second main door of the set of main doors comprises a second recess and a second rim, wherein the first rim is configured to nest within the second recess when the set of main doors are in the closed position, and wherein the second rim is configured to nest within the first recess when the set of main doors are in the closed position.

15. The poke-through floor box assembly of claim 14, further comprising a main door sealing member extending partially across the second recess, wherein the second recess is fluidly connected with the fluid channel when the set of main doors are in the closed position.

16. The poke-through floor box assembly of claim 10, wherein the cover assembly comprises:
  a torsion spring including a first leg in contact with the first main door of the set of main doors and a second leg in contact with the cable access door; and
  a spring support coupled to an interior surface of the first main door of the set of main doors, wherein the torsion spring extends around a shaft of the spring support.

17. The poke-through floor box assembly of claim 10, wherein the cable access door comprises:
  an outer surface extending through a cable access opening, wherein the outer surface is co-planar with an outer surface of the set of main doors when the cable access door is in a closed position; and
  a perimeter channel extending around the outer surface, wherein the perimeter channel is fluidly connected with the fluid channel when the cable access door is in the closed position and when the set of main doors are in a closed position.

18. A cover assembly of a poke-through floor box assembly, the cover assembly comprising:
  a frame including a sidewall surrounding an interior;
  a ledge extending into the interior from the sidewall, wherein the ledge includes a fluid channel recessed into an upper surface of the ledge, and wherein the fluid channel has an outlet extending through the sidewall; and
  a set of main doors rotatably coupled to the sidewall, wherein a first main door of the set of main doors includes a cable access door, and wherein the cable access door is rotatably coupled to the first main door, wherein the first main door of the set of main doors comprises a first recess and a first rim, wherein a second main door of the set of main doors comprises a second recess and a second rim, wherein the first rim is configured to nest within the second recess when the set of main doors are in the closed position, and wherein the second rim is configured to nest within the first recess when the set of main doors are in the closed position; and
  a main door sealing member extending partially across the second recess, wherein the second recess is fluidly connected with the fluid channel when the set of main doors are in the closed position.

19. The cover assembly of claim 18, wherein the fluid channel comprises a first section extending around an inner perimeter of the frame, wherein the first section is connected with the outlet to deliver a fluid from the interior of the frame.

20. The cover assembly of claim 18, wherein the frame further comprises an upper flange extending from the sidewall, wherein the upper flange is co-planar with the set of main doors when the set of main doors are in a closed position.

* * * * *